US007069036B2

(12) United States Patent
Jarett

(10) Patent No.: US 7,069,036 B2
(45) Date of Patent: Jun. 27, 2006

(54) SYSTEM AND METHOD FOR MINIMIZING INTERFERENCE IN A SPOT BEAM COMMUNICATION SYSTEM

(75) Inventor: Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 556 days.

(21) Appl. No.: 10/365,917

(22) Filed: Feb. 13, 2003

(65) Prior Publication Data

US 2003/0203737 A1    Oct. 30, 2003

Related U.S. Application Data

(60) Provisional application No. 60/376,239, filed on Apr. 29, 2002.

(51) Int. Cl.
*H04B 7/185* (2006.01)
(52) U.S. Cl. ............... 455/522; 455/12.1; 455/429; 455/452.2; 455/453
(58) Field of Classification Search ............ 455/522, 455/12.1, 13.1–4, 427–30, 561, 562.1, 447, 455/450, 451, 452.1, 452.2, 453, 454
See application file for complete search history.

(56) References Cited

U.S. PATENT DOCUMENTS

| 5,974,315 | A | * | 10/1999 | Hudson ............... 455/12.1 X |
| 6,047,161 | A | * | 4/2000 | Sowles et al. ............ 455/12.1 |
| 6,704,543 | B1 | * | 3/2004 | Sharon et al. ............ 455/12.1 |

* cited by examiner

*Primary Examiner*—Edan Orgad
*Assistant Examiner*—Philip J. Sobutka
(74) *Attorney, Agent, or Firm*—Gates & Cooper LLP

(57) ABSTRACT

A method and apparatus for transmitting data to a plurality of users, each individual user disposed in one of a plurality of cells is disclosed. One embodiment of the method comprises the steps of defining a first set of receivers from at least a portion of the plurality of receivers according to a first desired power level range, defining a first group of receivers from the first set of receivers according to a first spatial isolation constraint, defining a second set of receivers from a remaining plurality of receivers not a member of the first set of receivers according to a second desired power level range, defining a second groups of receivers from the second set according to a second spatial isolation constraint, and assigning a first transmission channel to the first group and a second transmission channel to the second group.

37 Claims, 15 Drawing Sheets

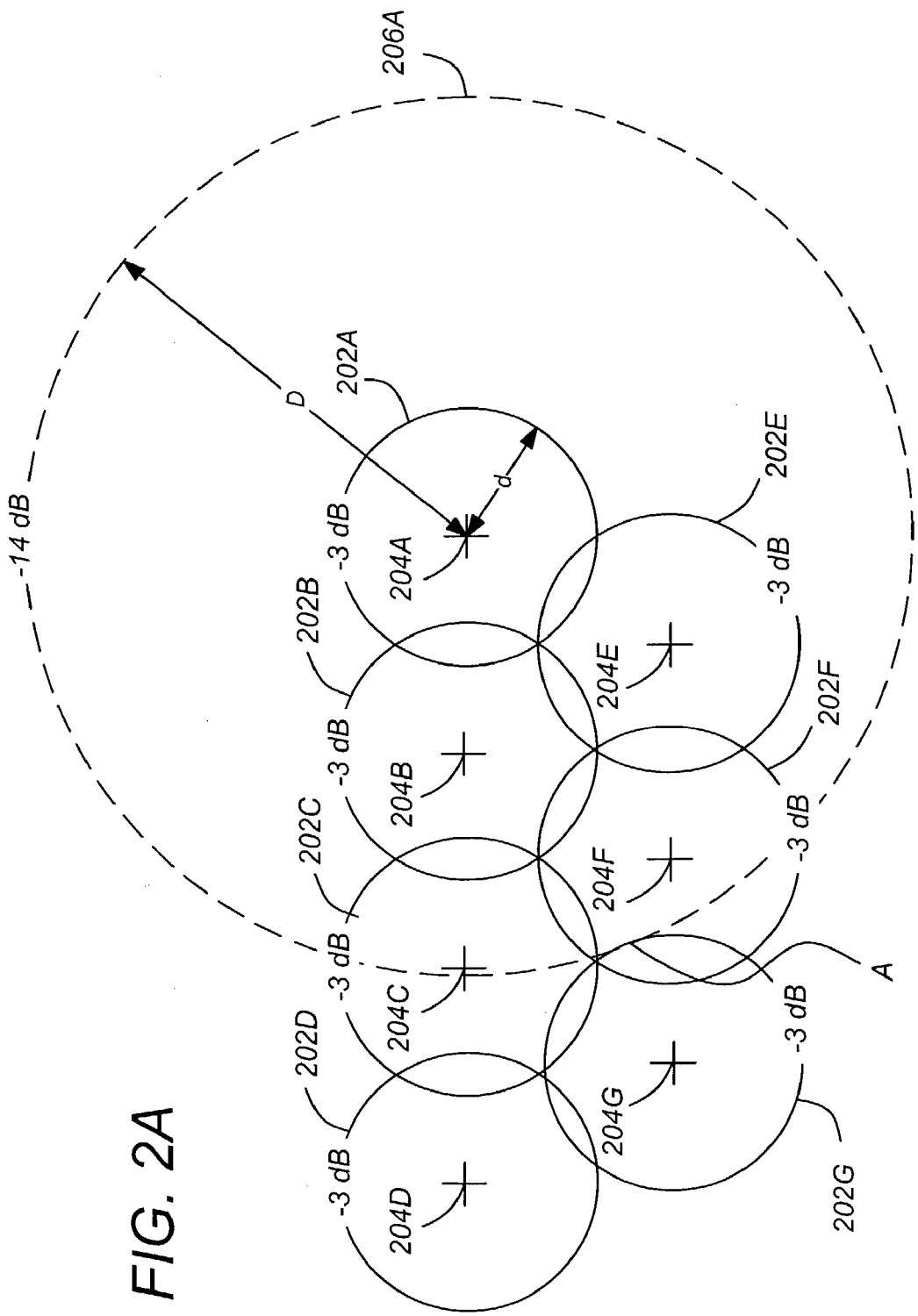

|  | TIME SLOT 1 | TIME SLOT 2 | TIME SLOT 3 | TIME SLOT 4 | TIME SLOT 5 | TIME SLOT 6 |
|---|---|---|---|---|---|---|
| FREQUENCY | +5 db | +4 db | +3 db | +2 db | +1 db | +0 db |
| FREQUENCY | +0 db | +5 db | +4 db | +3 db | +2 db | +1 db |
| FREQUENCY | +1 db | +0 db | +5 db | +4 db | +3 db | +2 db |
| FREQUENCY | +2 db | +1 db | +0 db | +5 db | +4 db | +3 db |
| FREQUENCY | +3 db | +2 db | +1 db | +0 db | +5 db | +4 db |
| FREQUENCY | +4 db | +3 db | +2 db | +1 db | +0 db | +5 db |
| TOTAL POWER | +3.6 db | +3.6 db | +3.6 db | +3.6 db | +3.6 db | +3.6 db |

*FIG. 5*

SYSTEM AND METHOD FOR MINIMIZING INTERFERENCE IN A SPOT BEAM COMMUNICATION SYSTEM

CROSS-REFERENCE TO RELATED APPLICATIONS

This application claims benefit of U.S. Provisional Patent Application No. 60/376,239, entitled "C/I MINIMIZATION FOR SPOT BEAM COMMUNICATION SYSTEM," by Keith Jarett, filed Apr. 29, 2002, which application is hereby incorporated by reference.

BACKGROUND OF THE INVENTION

1. Field of the Invention

The present invention relates to systems and methods for transmitting digital information to a plurality of users, and in particular to a system and method for minimizing interference between spot beam transmissions.

2. Description of the Related Art

The methods by which movies and other media programs that are distributed to theaters for display to audiences have not substantially changed in over 75 years. Cellophane copies of such movies are distributed to each theater in advance of the first showing, and the same copy is repeatedly displayed for audiences until the movie is excessively worn, the license expires, or the theater stops showing the movie in favor of a more popular movie.

There are several problems with this process. Fist, the process of manually and securely distributing physical cellophane copies of each movie is costly. Second, it is time consuming. This is especially important in circumstances where last minute changes must be made to the film before release. Such time concerns often prohibit that any such changes be made.

There is therefore a need for a method and system for distributing media programs in a rapid and inexpensive manner. One possible solution is to transmit digital copies of the movies via a satellite or other high bandwidth medium. However, this solution has its challenges in that the transmission of highly detailed media programs requires a high-bandwidth link between the content provider and the entity displaying the media program.

One technique of increasing the bandwidth is to transmit the data via spot beams. Modern satellites often employ a beam laydown that forms a cellular coverage of a wide geographic area to improve performance. In addition to providing better performance, the narrow beams also allow spatial re-use of the same frequency or time slot, so that the total throughput bandwidth of the satellite can be several times the allocated frequency band. The degree of spatial frequency re-use depends on the carrier-to-interference (C/I) ratio, which is the ratio of the magnitude of the carrier of the desired channel to the magnitude of the interference. In a spot-beam system, the C/I is typically dominated by co-channel interference caused by re-uses of the same frequency and time slot in nearby cells.

The satellite antenna is responsible for ensuring that its transmissions to a given cell do not leak into other cells that re-use the same frequency. The isolation ratio between the weakest desired signal and the strongest interfering signal is typically in the range of 14 to 20 dB when the re-use is as close to the desired cell as it is permitted to be. For example, if the system has a 4 "color" re-use, the nearest re-use of the same frequency could be at the nearest edge of a cell that is centered 2 radii from the center of the desired cell. In this example, a given cell can have 4 nearby re-uses of its frequency, meaning that the aggregate C/I ratio is lower by a factor of 4, or equivalently 6 dB.

Also, in some circumstances a particular user needs more transmitted power from the satellite than another. This differential could be due to weather, obstructions, or the fact that one user is near the center of the cell while the other is at the edge of his cell where the gain of the transmitting antenna is lower. The system accommodates these differences by transmitting the downlink signal of a particular spot beam at higher power than other spot beams, and hence interfering transmission may be at a higher original level than the desired transmission. In spot-beam systems, performance is often limited more by C/I than by C/N (carrier to noise ratio). The fact that the transmitted power differential reduces the worst-case C/I dB for dB is thus a major detriment to system performance.

What is needed is a system and method for minimizing or eliminating such higher-power interfering transmissions. The present invention satisfies this need.

SUMMARY OF THE INVENTION

To address the requirements described above, the present invention discloses a method and apparatus for transmitting data to a plurality of users, each individual user disposed in one of a plurality of cells. One embodiment of the method comprises the steps of defining a first set of receivers from at least a portion of the plurality of receivers according to a first desired power level range; defining one or more first groups of receivers from the first set of receivers according to a first spatial isolation constraint; defining a second set of receivers from a remaining plurality of receivers not a member of the first set of receivers according to a second desired power level range; defining one or more second groups of receivers from the second set according to a second spatial isolation constraint; and assigning a first transmission channel to the one or more first groups and a second transmission channel to the one or more second group.

Preferably, the first channel and second channel are substantially orthogonal in that transmissions in one channel are effectively isolated from other channels. For example, the different groups could use different frequencies or different time slots during a time division multiplexed (TDM) frame. The result is that higher-power transmissions interfere only with each other, and lower-power transmissions interfere only with each other. Because there is no transmitted power differential in the C/I computation, link performance is maximized.

The apparatus comprises a processor and a memory communicatively coupled to the processor, the memory storing processor instructions for defining a first receiver group and a second receiver group from at least a portion of the plurality receivers, the first receiver group defined according to a first power level of a first spot beam transmitted to the first receiver group and the second receiver group defined according to a power level of a second spot beam transmitted to the second receiver group.

The present invention can be practiced in two key embodiments. The first embodiment includes a static implementation, in which users are assigned to a power class a priori, based on essentially fixed characteristics such as terminal size or location. The system design segregates the classes to be served by orthogonal channels, so as to minimize interference from higher power transmissions into receivers whose desired signals are smaller. The second embodiment is dynamic, in that the transmission level that a user requires is permitted to change during a connection, and in which the user is then handed off to another channel (e.g., frequency or time slot) without dropping the circuit or virtual circuit connection.

BRIEF DESCRIPTION OF THE DRAWINGS

Referring now to the drawings in which like reference numbers represent corresponding parts throughout:

FIGS. 2A and 2B are diagrams illustrating how increased power in adjacent or nearby spot beams can adversely affect the C/I ratio of a received signal;

FIG. 5 is a diagram illustrating a further embodiment of the present invention in which higher power transmissions are distributed among the different channels so as to substantially equalize power across the channels.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1A:
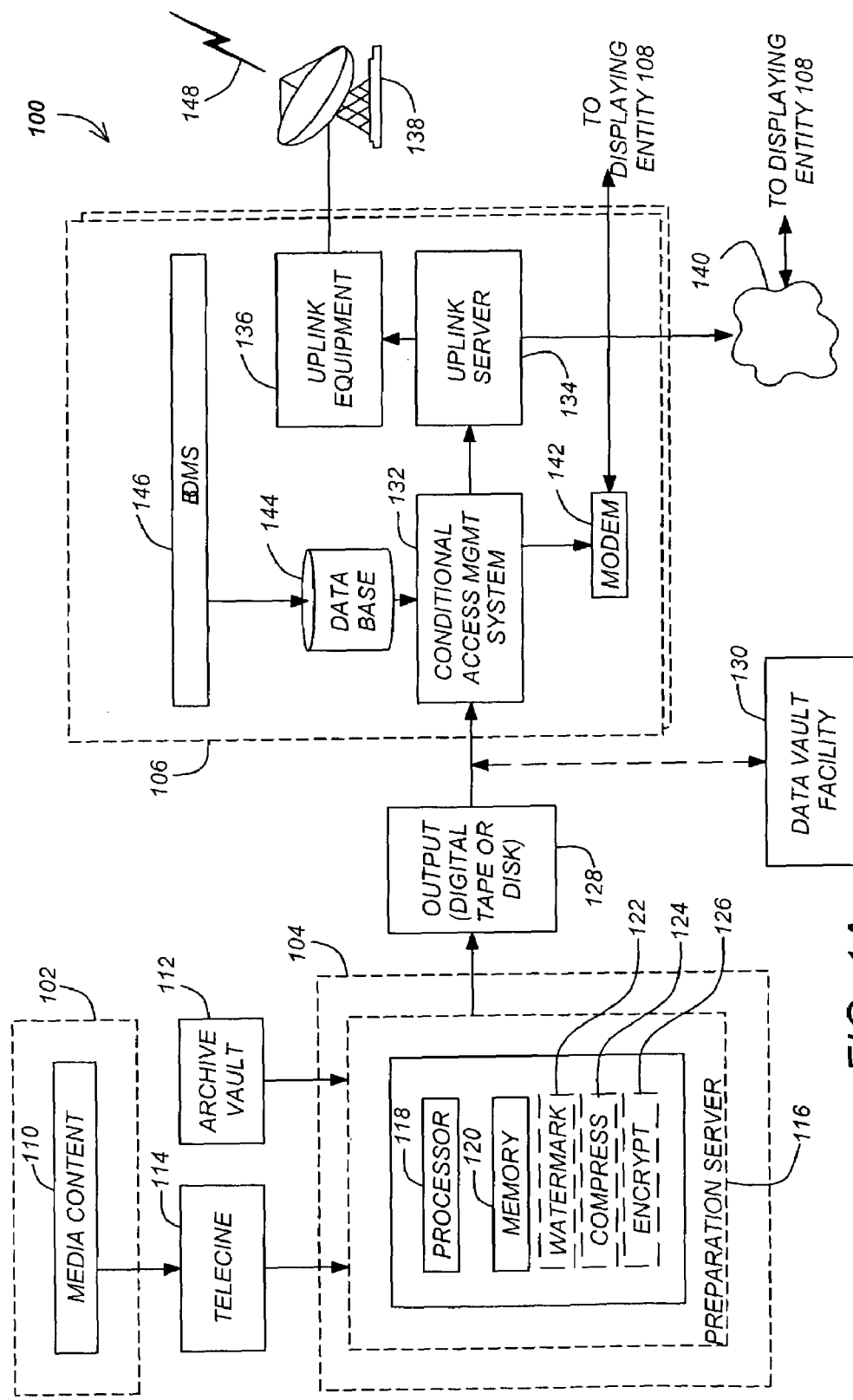
FIGS. 1A and 1B are diagrams illustrating one embodiment of a media distribution architecture.
Figure 1B:
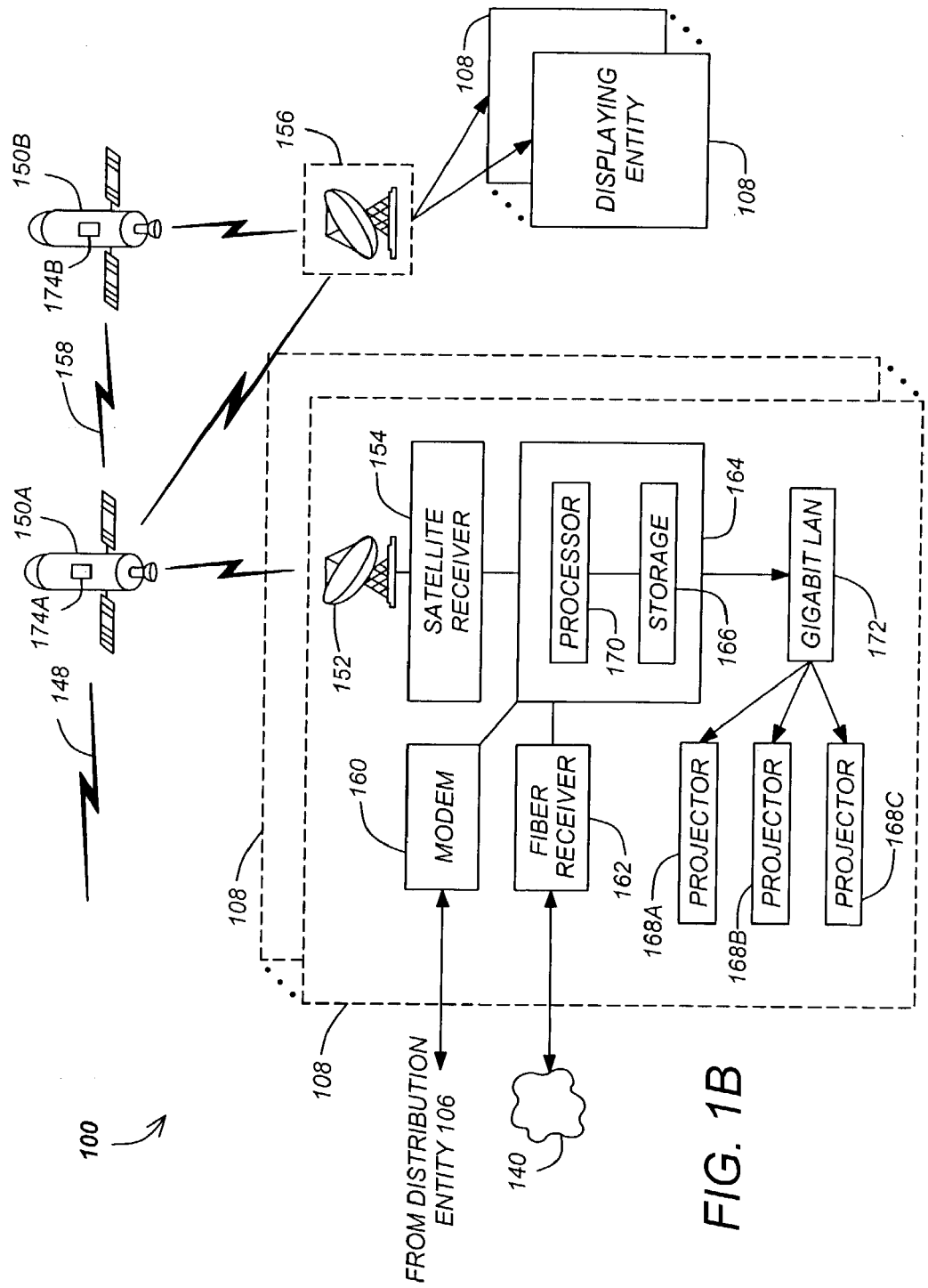

FIGS. 1A and 1B depict a top-level functional block diagram of one embodiment of a media program distribution system 100. The media distribution system 100 comprises a content provider 102, a protection entity 104, a distribution entity 106 and one or more presentation/displaying entities 108. The content provider 102 provides media content 110 such as audiovisual material to the protection entity 104. The media content 110, which can be in digital or analog form, can be transmitted in electronic form via the Internet, by dedicated land line, broadcast, or by physical delivery of a physical embodiment of the media (e.g. a celluloid film strip, optical or magnetic disk/tape). Content can also be provided to the protection entity 104 (also referred to as a preparation entity) from a secure archive facility 112.

The media content 110 may be telecined by processor 114 to format the media program as desired. The telecine process can take place at the content provider 102, the protection entity 104, or a third party.

The protection entity 104 may include a media preparation processor 116. In one embodiment, the media preparation processor 116 includes a computer system such as a server, having a processor 118 and a memory 120 communicatively coupled thereto. The protection entity 104 further prepares the media content 110. Such preparation may include adding protection to the media content 110 to prevent piracy of the media content 110. For example, the preparation processor 116 can add watermarking 122 and/or encrypt 126 the media content 110 to protect it. In addition, the preparation processor can also apply compression 124 to the media content 110. Once prepared, the output media content 128 can be transferred to digital tape or a disk (e.g. a DVD, laser disk, or similar medium). The output media content 128 can then be archived in a data vault facility 130 until it is needed.

When needed, the prepared output media content 128 is then provided to the distribution entity 106 (alternatively referred to hereinafter as the network operations center [NOC] or uplink facility). Although illustrated as separate entities, the protection entity 104 and the distribution entity 106 can be combined into a single entity, thus ameliorating some security concerns regarding the transmission of the output media content 128.

The distribution entity 106 includes a conditional access management system (CAMS) 132 (also referred to as a configuration management engine), that accepts the output media content 128, and determines whether access permissions are appropriate for the content 128. Further, CAMS 132 may be responsible for additional encrypting so that unauthorized access during transmission is prevented. Once the data is in the appropriate format and access permissions have been validated, CAMS 132 provides the output media content 128 to an uplink server 134, ultimately for transmission by uplink equipment 136 to one or more displaying entities 108 (also referred to as exhibitor systems) (shown in FIG. 1B). This is accomplished by the uplink equipment 136 and uplink antenna 138. Also, as shown, in addition or in the alternative to transmission via satellite, the media program can be provided to the displaying entity 108 via a forward channel fiber network 140. Additionally, information may be transmitted to displaying entity 108 via a modem 142 using, for example a public switched telephone network (PSTN) line. A land based communication such as through fiber network 140 or modem 142 is referred to as a back channel. Thus, information can be transmitted to and from the displaying entity 108 via the back channel or the satellite network. Typically, the back channel provides data communication for administration functions (e.g. billing, authorization, usage tracking, etc.), while the satellite network provides for transfer of the output media content 128 to the displaying entities 108.

The output media content 128 may be securely stored in a database 144. Data is transferred to and from the database 144 under the control and management of the business operations management system (BOMS) 146. Thus, the BOMS 146 manages the transmission of information to 108, and assures that unauthorized transmissions do not take place.

Turning to FIG. 1B, the data transmitted via uplink 148 is received in a satellite 150A, and transmitted via satellite transmitters 174A and 174B to a receiving station 108 such (alternately referred to hereinafter as the displaying entity), which includes a receive antenna 152 communicatively coupled to a satellite or downlink receiver 154.

In one embodiment, the satellite 150A also transmits the data to an alternate distribution entity 156 and/or to another satellite 150B via cross-link 158. Typically, satellite 150B services a different terrestrial region than satellite 150A, and transmits data to displaying entities 108 in other geographical locations.

A typical displaying entity 108 comprises a modem 160 (and may also include a fiber receiver 158) for receiving and transmitting information through the back channel (i.e., via an communication path other than that provided by the satellite system described above) to and from the distribution entity 106. For example, feedback information (e.g. relating to system diagnostics, billing, usage and other administrative functions) from the exhibitor 108 can be transmitted through the back channel to the distribution entity 106. The output media content 128 and other information may be accepted into a processing system 164 (also referred to as a content server) such as a server or computer. The output media content 128 may then be stored in the storage device 166 for later transmission to displaying systems (e.g., digital projectors) 168A–168C. Before storage, the output media content 128 can be decrypted to remove transmission encryption (e.g. any encryption applied by the CAMS 132), leaving the encryption applied by the preparation processor 116.

When the media content 110 is to be displayed, final decryption techniques are used on the output media content 128 to substantially reproduce the original media content 110 in a viewable form which is provided to one or more of the displaying systems 168A–168C. For example, encryption 126 and compression 124 applied by the preparation processor 118 is finally removed, however, any latent modification, undetectable to viewers (e.g., watermarking 122) is left intact. In one or more embodiments, a display processor 170 prevents storage of the decrypted media content in any media, whether in the storage device 166 or otherwise. In addition, the media content 110 can be communicated to the displaying systems 168A–168C over an independently encrypted connection, such as on a gigabit LAN 172.

Figure 2B:
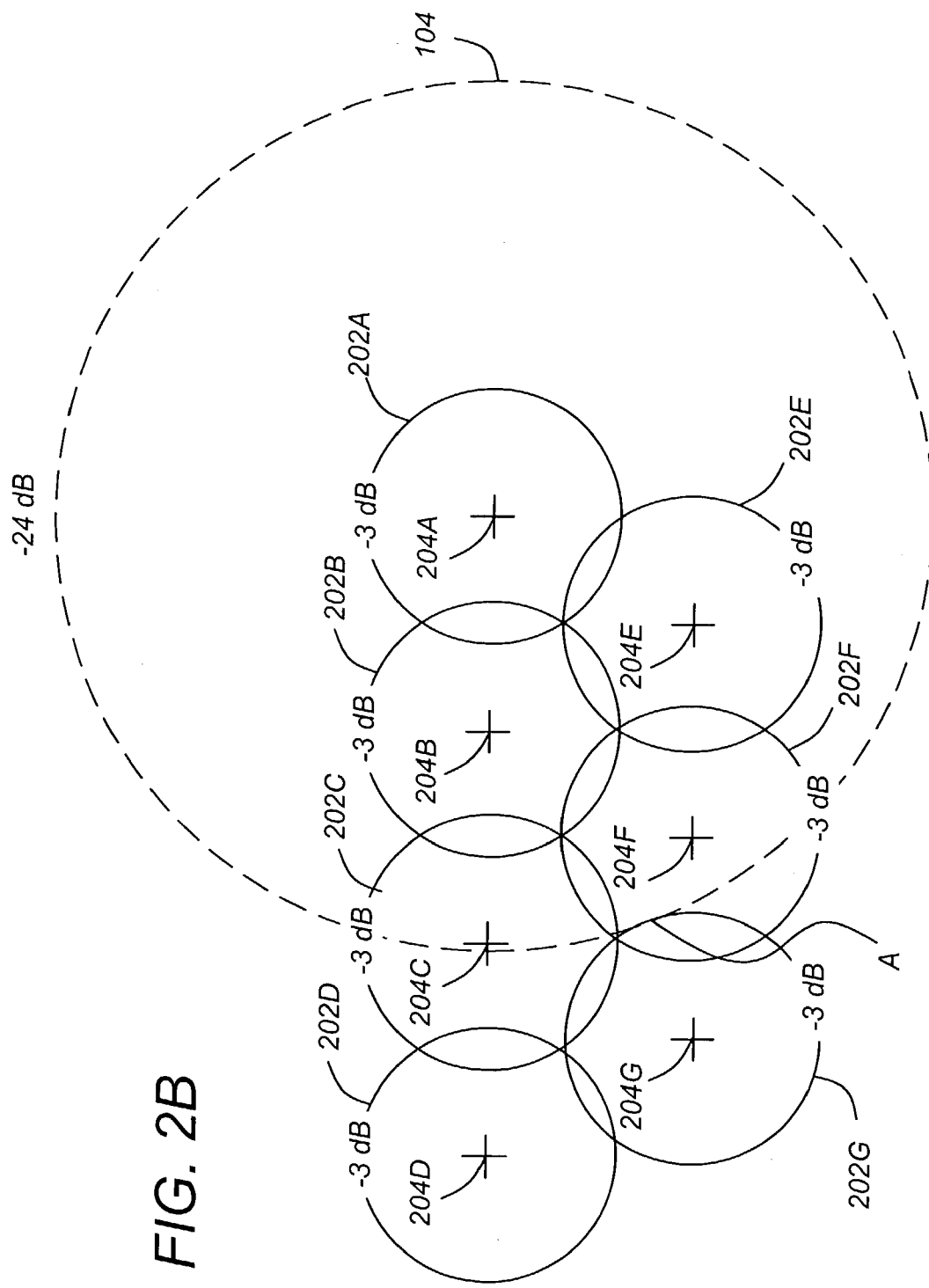

FIGS. 2A and 2B are diagrams illustrating how increased power in adjacent spot beams can adversely affect the C/I ratio of the received signal. The actual relationship between the magnitude of the transmitted signal and the distance from the boresight is typically more complex (typically having a main lobe and several side lobes), but for purposes of explanation, it is assumed that the strength of the signal decreases as the angular distance from the boresight increases. If the amplitude of the signal received at boresight location 204A is referenced at 0 dB, the amplitude of the signal terrestrially received at some distanced radially away from the boresight is about three decibels below (−3 dB) the amplitude of the signal received at the boresight location 204A. Contour line 202A shows a locus of points for which the transmitted signal is −3 dB relative to the boresight amplitude. Similarly, dashed contour 206A shows a locus of points for which the transmitted signal is −20 dB relative to the boresight amplitude, at radius D.

The satellite 150 transmits a signal to a plurality of displaying entities 108 using a plurality of spot beams, 202A–202G (hereinafter collectively referred to as spot beams 202). Although the spot beams 202 may overlap, each generally serves a geographical area, sometimes referred to as a cell. Cells are defined by the locus of points for which reception of the spot beam meets acceptable parameters for noise, distortion, and interference.

In the exemplary embodiment shown in FIG. 2A, spot beams 202 transmitting on the same channel are used to cover a wide geographical area. As described above, the amplitude of the transmitted spot beam signal varies with the distance from the boresight. Further, even at large angles away from boresight, the transmitted spot beam may have substantial amplitude (e.g. only −20 dB at radial distance D from the boresight). Interference between cells is the result. At location "A", the ratio of the desired signal (from the spot beam centered at 204G and the undesired signal from the spot beam centered at 204A is (−3 dB)–(−20 dB) or 17 dB. Interference also results from the other adjacent spot beams (e.g., those having boresight 204C and 204D).

FIG. 2B shows the situation if the interfering spot beam (the one centered at boresight 204A uses a 6 dB higher power than the nominal power (0 dB). This could be the case, for example, if the terrestrial cell served by this spot beam were experiencing weather-related attenuation. In this case, at point "A" the magnitude of the interfering beam is +6–(−20 dB) or 14 dB, and the C/I ratio is 3–(−14) or 11 dB. This shows that the C/I ratio is worsened as the average power of adjacent spot beams increase.

Figure 3A:
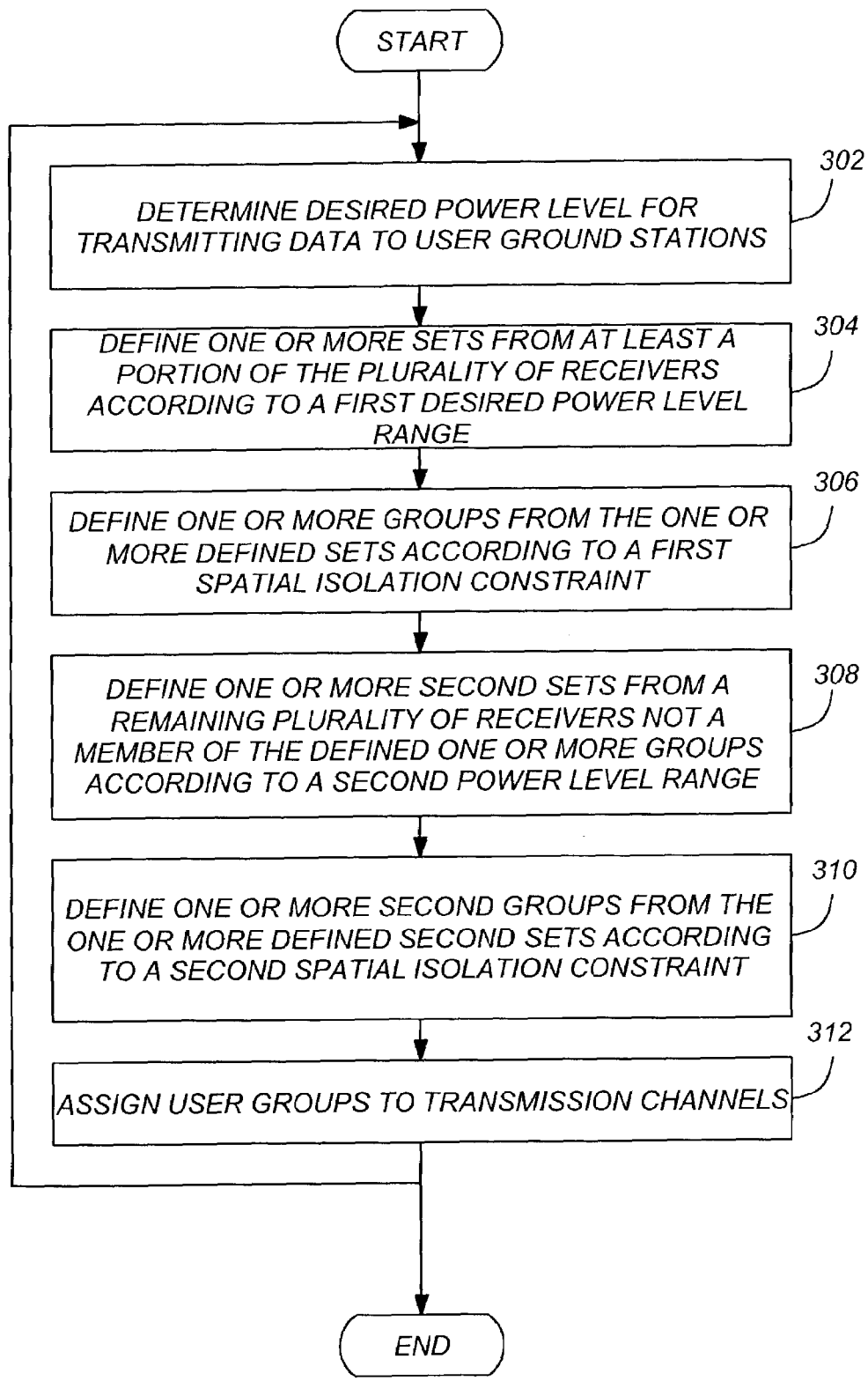
FIGS. 3–3D are flow chart presenting exemplary operations that can be used to practice one embodiment of the present invention.
Figure 3B:
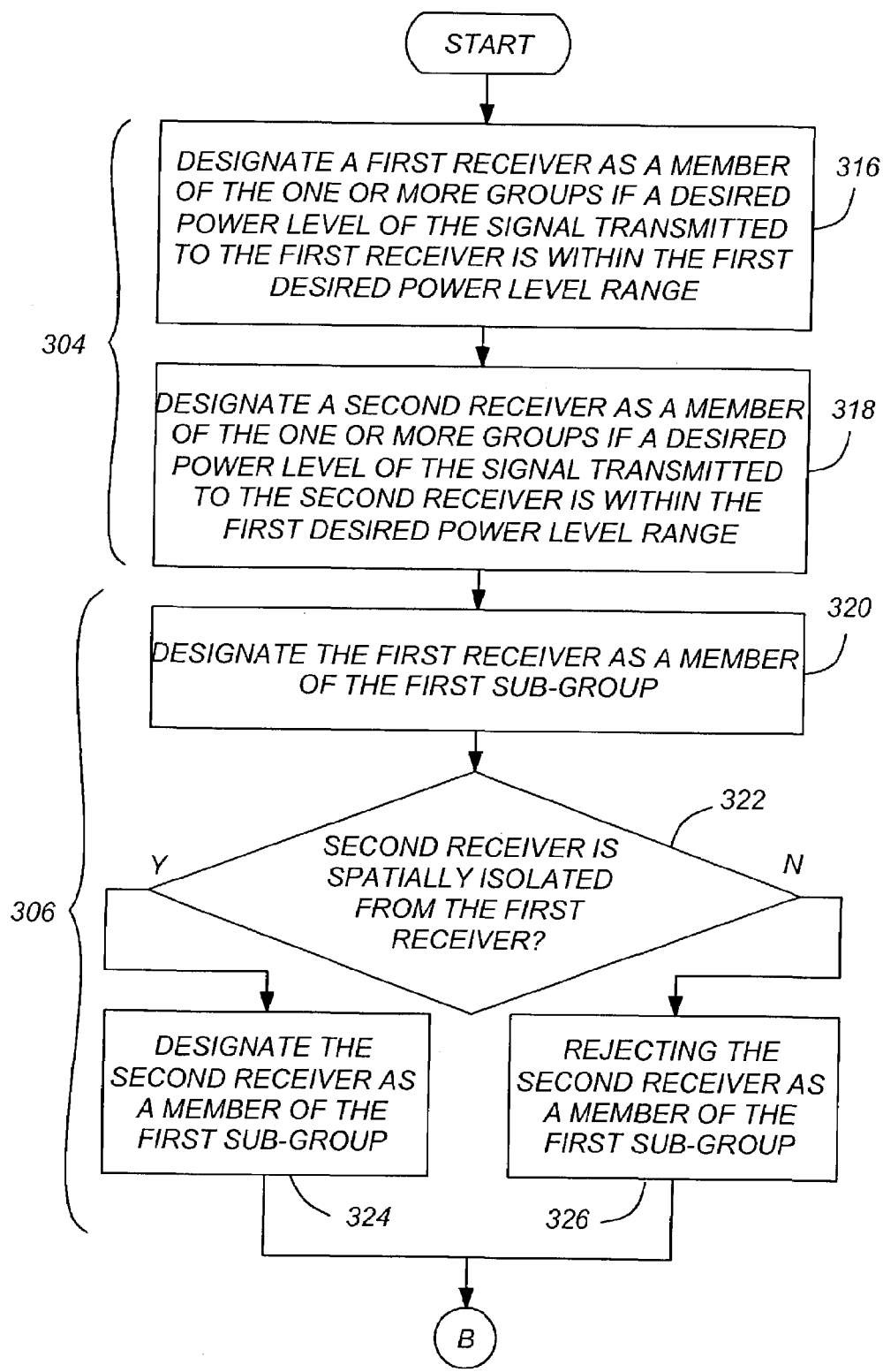
Figure 3C:
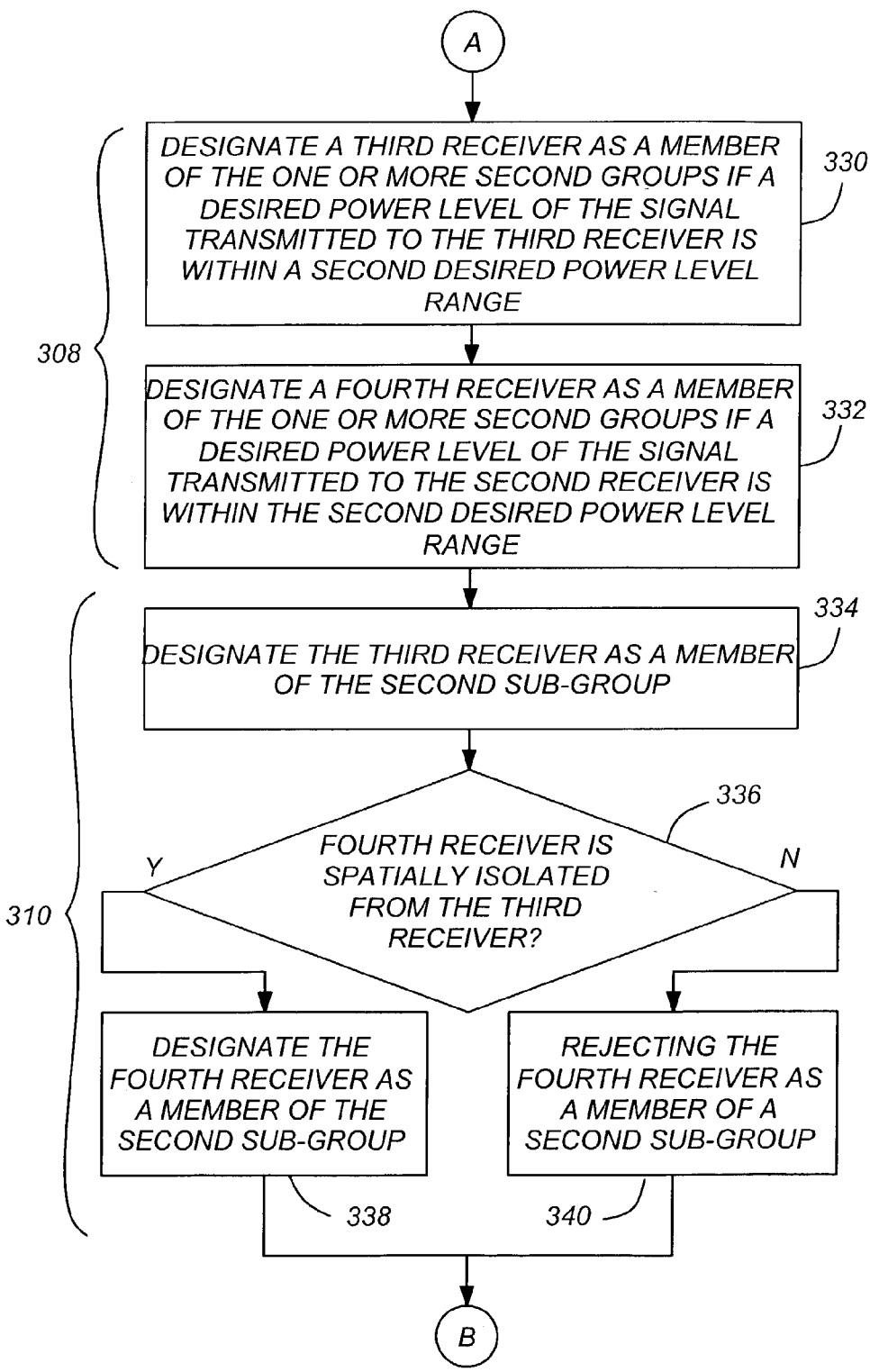
Figure 4A:
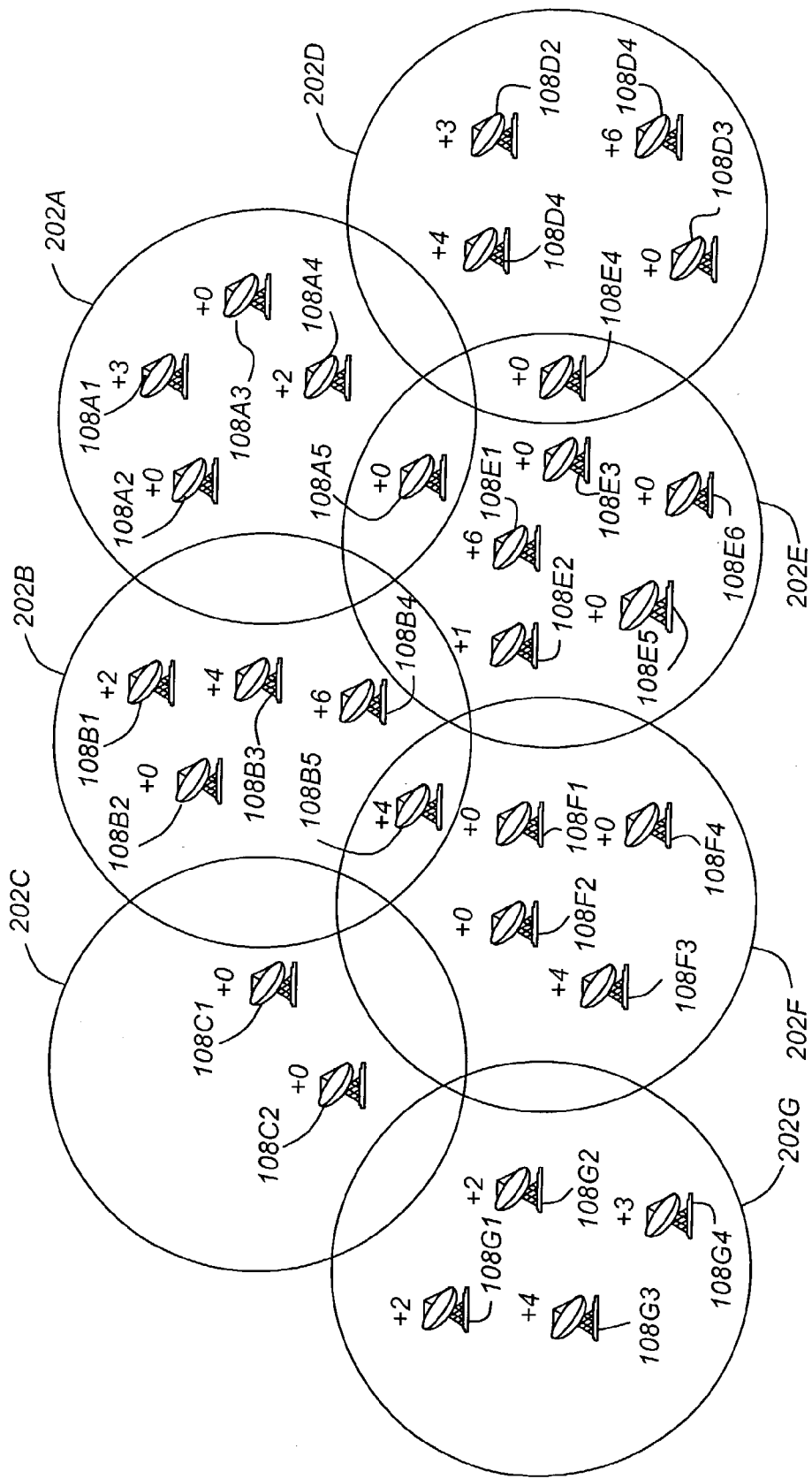
FIGS. 4A–4E are diagrams illustrating the application of one embodiment of the present invention.

FIGS. 3A–3C and 4A–4E are diagrams illustrating one embodiment of the present invention. FIG. 3A presents a flow chart of illustrative operations, FIGS. 3B–3C present further detail regarding the operations depicted in FIG. 3A, FIG. 4A illustrates the application of spot beams to cells, and FIGS. 4B–4E illustrates the grouping of users into groups according to power level and into subgroups according to spatial diversity.

Referring first to FIG. 3A, a computation is performed to determine a power level desired for transmitting data to user ground stations. This is shown in block 302. Different power levels are used to account for atmospheric attenuation, reduced beam antenna gain (particularly off-boresight), and other factors.

FIG. 4A shows a plurality of terrestrially-based receiver stations such as display entities 108A1–108G4 (hereinafter collectively referred to as receiver stations 108). Data is transmitted to the receiving stations 108 by associated spot beams 202A–202G, respectively, at the power levels indicated for each receiver station 108. Depending on the minimum radius of the spot beam and other factors, some receiver stations may be designated to receive a higher power level signal than would otherwise be necessary. For example, none of the receiver stations within spot beam 202C require a power level greater than nominal. Therefore, spot beam 202C will transmit a signal at the nominal power level. Two of the receiver stations (e.g. 108A1 and 108A4) within spot beam 202A require an increased power level (e.g. 3 and 2 dB, respectively) above the nominal value, and will receive a spot beam having an increased power level. Typically, the power level is selected so that every receiver station 108 receives a minimum power signal to assure adequate reception at that power station. However, the spot beam 202 output power may be selected so as to provide the majority of the receiver stations the desired signal strength, yet a small number of receiver station 108 receive less than the value required to result in a baseline service value. This can happen, for example if the particular receiver station 108 is in an intense storm. As described above, increasing power in on cell (areas served by spot beams 202) can decrease the carrier to interference ratio in adjacent cells. To ameliorate this problem, the present invention groups receiver stations according to power level, and assigns different (substantially orthogonal in at least one dimension) channels to receiver stations in physically adjacent (or nearby) cells.

Returning to FIG. 3A, a first set of receivers is defined from at least a portion of the plurality of receivers according to a first desired power level This is shown in block 304. Next, one or more groups are defined from the first set according to a first spatial isolation constraint, as shown in block 306. As described below, groups will be assigned different transmission channels, thus assuring that receiver stations 108 within the same group (and hence the same desired power level range) sufficiently separated so that signals intended for one of the receiver stations 108 does not interfere with another of the receiver stations.

In block 308, a second set of receivers is defined from the receiver stations that have not been designated as members of the first set, wherein each of the receiver stations in the second set are defined according to a second power level range. One or more second groups are then defined from the second set according to a second spatial isolation constraint. This is shown in block 310. As described further below, the second spatial isolation constraint may be equivalent to the first spatial isolation constraint, but need not be so. Finally, as shown in block 312, all groups are assigned to transmission channels.

Figure 3D:
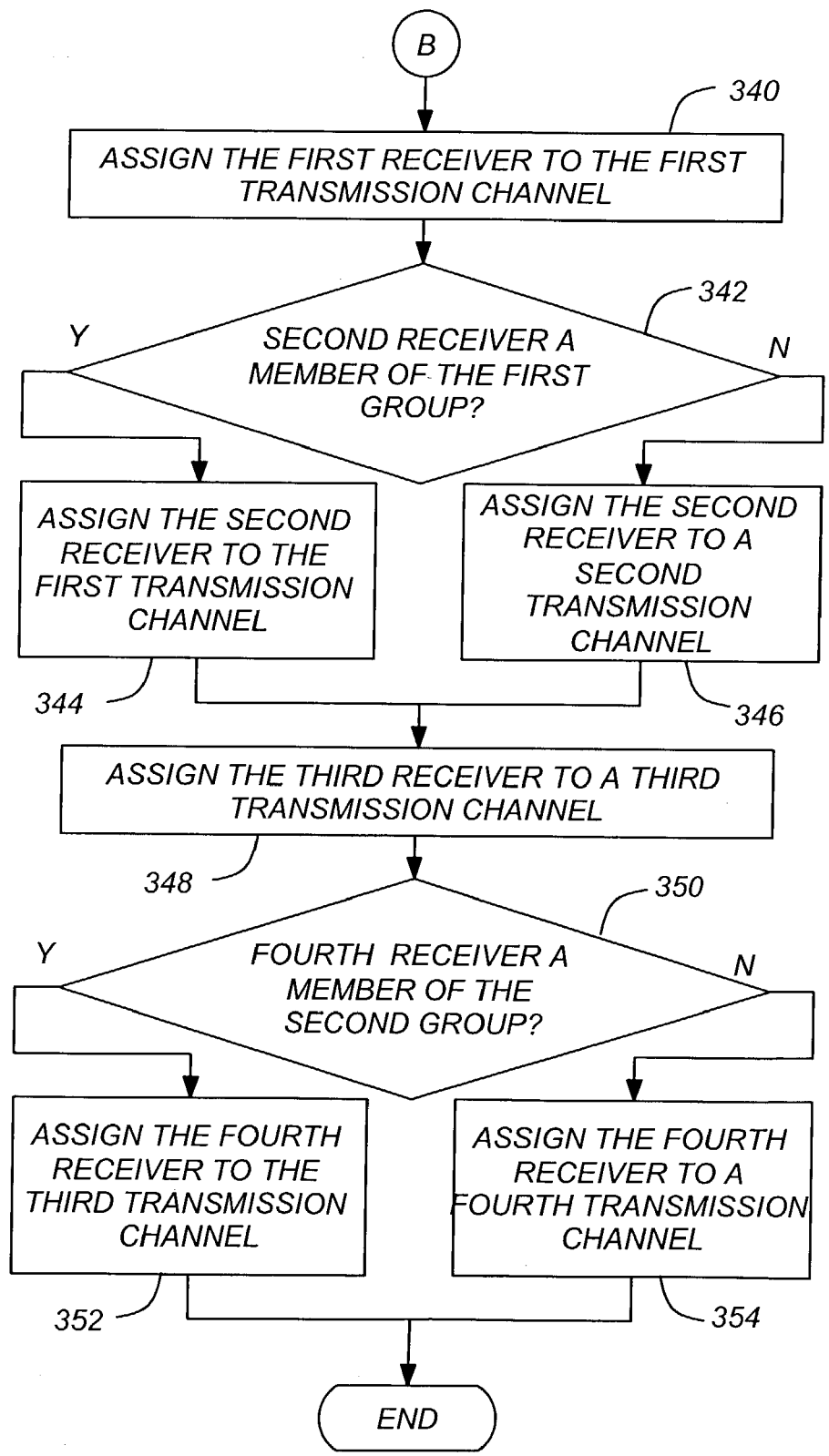
Figure 4B:
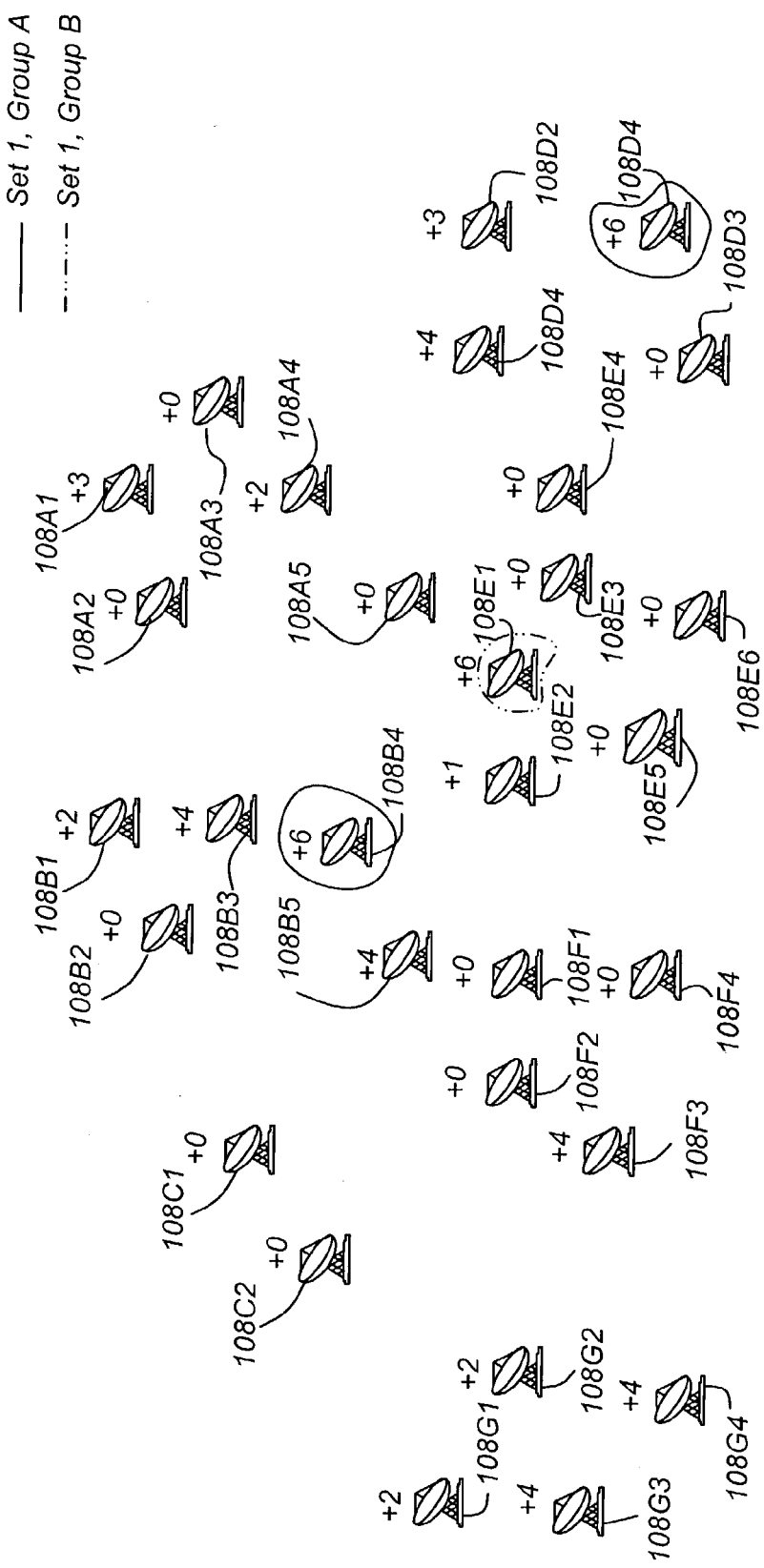
Figure 4C:
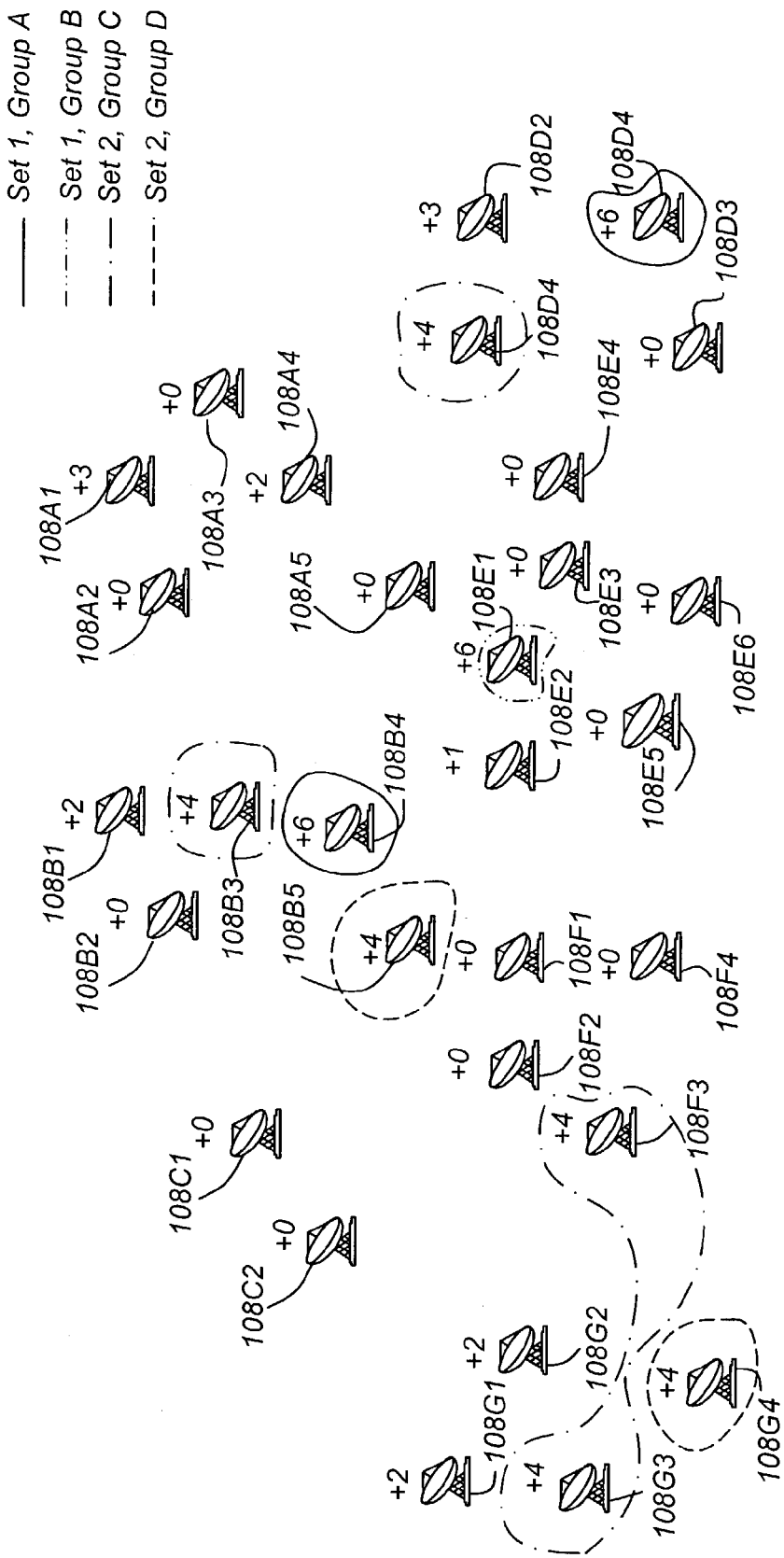
Figure 4D:
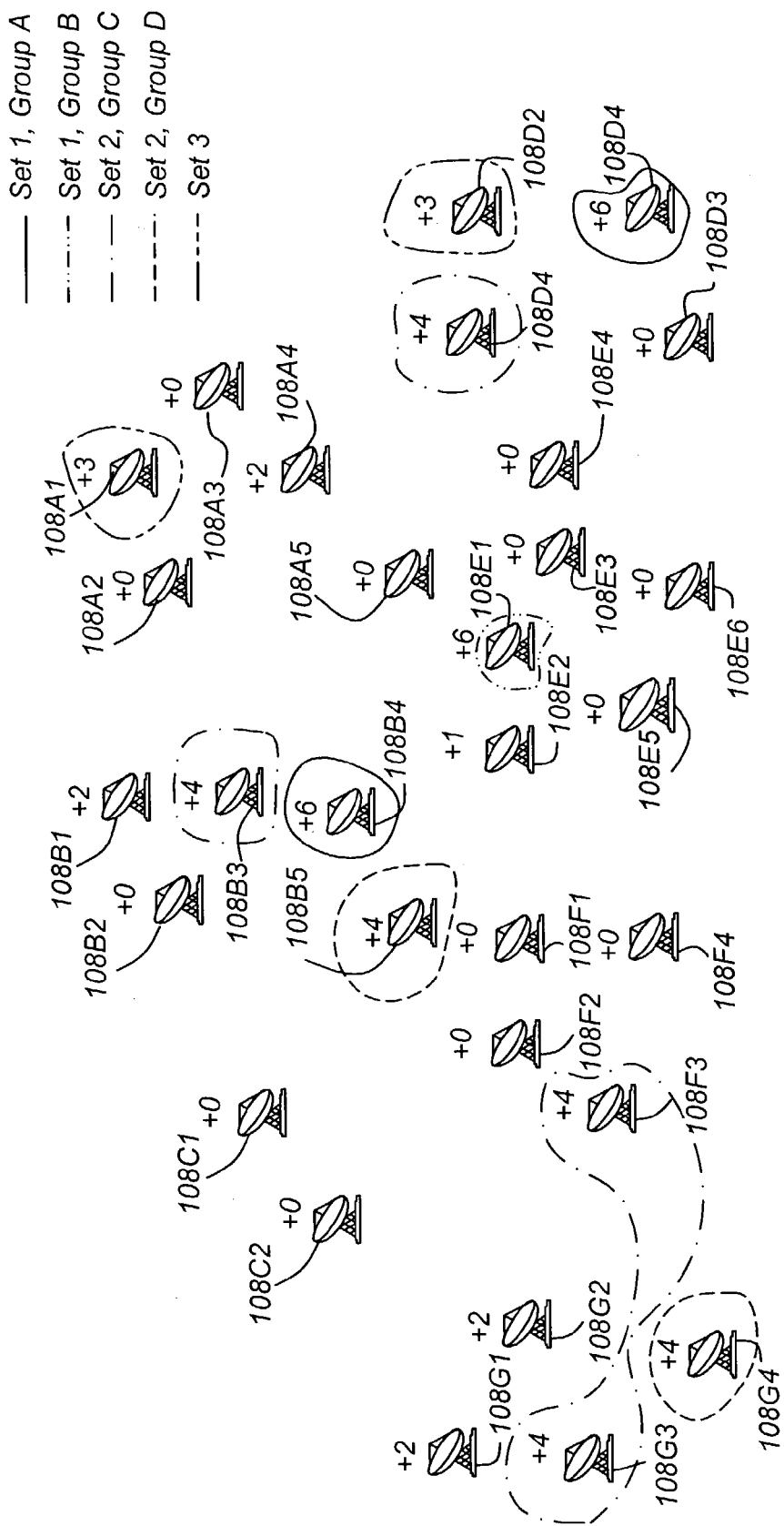

FIGS. 3B–3D are diagrams showing a more specific examplary embodiment of the process shown in FIG. 3A, and for purposes of illustration, will be described with reference to FIGS. 4B–4D.

A first receiver 108B4 is designated as a member of the first set if a desired power level of the signal received by the first receiver is within a first desired power level range (e.g. +6 db±½ dB), as shown in block 316. A second receiver (e.g. 108D4) is designated as a member of the first set if the desired power level for the signal received by (or the signal transmitted to) the second receiver 108D4 is within the first desired power level range. This process continues until all receivers having the same desired power level range are designated as members of the set (in the example shown in FIG. 4B, Set 1). The first receiver 108B4 is designated as a member of the first group (in FIG. 4, Group A). In block 322, a determination is made as to whether the second receiver 108D4 is spatially isolated from the first receiver from the first receiver 108B4 (e.g. separated from the first receiver by a sufficient terrestrial distance to prevent same-channel interference). If so (as shown in FIG. 4B), the second receiver 108D4 is designated a member of the Group A, the same Group as the first receiver 108B4. If the second receiver were not spatially isolated from the first receiver 108B4 (as is the case with receiver 108E1 in FIG. 4), the second receiver is rejected as a member of the first group, and instead, designated as a member of a different group (e.g. Group B). This is illustrated in blocks 324 and 326. This process continues until all of the receiver stations 108 with within the same power level range have been placed into sets (and groups if the spatial isolation criteria is not met for some receiver stations 108).

Referring now to FIG. 3C, a third receiver which has thus far not been designated as a member of any set (e.g. 108G3 and has a desired power level within a second power level range (e.g. +4±½ dB), is designated as a member of a second set (e.g. Set 2). This is shown in block 330. A fourth receiver (e.g. 108G4) is also designated as a member of Set 2, as its desired power level is also within the same desired power range, as shown in block 332. Other receivers also within the second desired power level range are designated as members of Set 2 (including receivers 108G4, 108F3, 108B5, 108B3, 108D4).

Figure 4E:
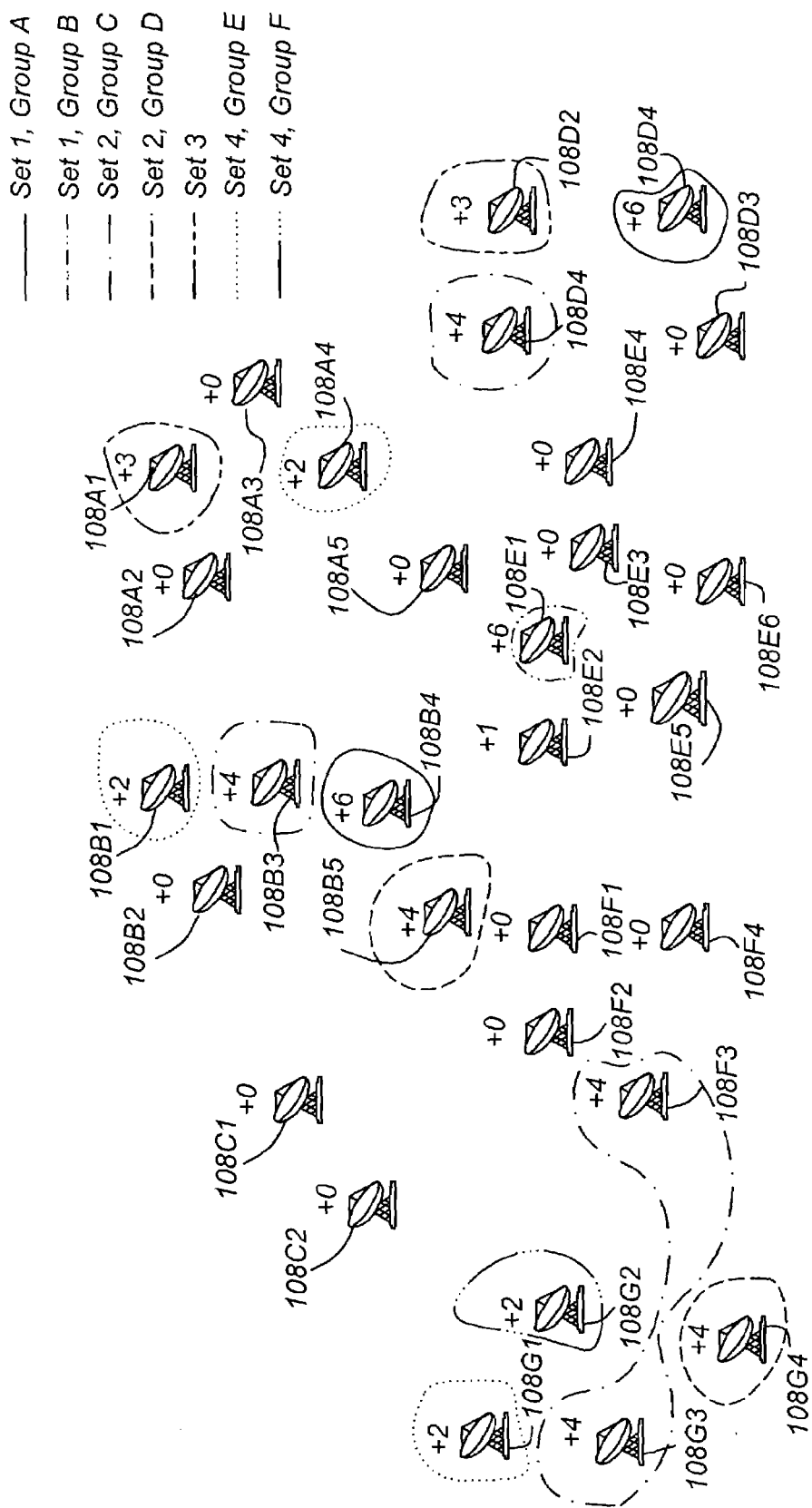

In block 334, the third receiver 108G3 is designated as a member of a second Group (e.g. Group C). If a fourth receiver is spatially isolated from the third receiver (e.g. as receiver 108F3 is separated by a sufficient distance from receiver 108G3), it is designated as a member of the same (second) group (e.g. Group C), as shown in blocks 336 and 338. If the fourth receiver is not spatially isolated from the third receiver (e.g. as receiver 108G4 is not separarated by a sufficient distance from receiver 108G3), it is rejected as a member of the second group and assigned to a different group (e.g. Group D). This process continues until all of the members of Set 2 are assigned to a group. Finally the operations of block 330–340 are repeated for the remaining receiver stations until all of the receivers 108 of interest have been assigned to a set or group according to the desired power level and spatial isolation critiera. FIGS. 4D and 4E illustrate the assignment of other receivers 108 into additional sets and groups. Set 3 has no groups, as all of the members of that set are spatially isolated.

Referring now to FIG. 3D, the each of the groups is assigned a transmission channel. The first receiver (e.g. 108B4) is assigned to a first transmission channel, as shown in block 340. The second receiver is assigned to the first transmission channel if it, like the first receiver 108B4), was designated as a member of the first group (Group A). Referring to FIG. 4B, for example, receiver 108D4 is assigned the same transmission channel as the first receiver 108B4. The second receiver is instead assigned to different transmission channel if it is not a member of the same group as the first receiver 108B4. Referriing to FIG. 4B, for example, because receiver 108E1 was designated as a member of a different group than the first receiver 108B4, it is assigned a different transmission channel. These operations are illustrated in blocks 342–346.

Similarly, a third recevier 108G3 is assigned to a third transmission channel, as shown in block 348. A fourth receiver is assigned to the third transmission channel if it, like the third receiver 108G3, was designated as a member of the second group (Group D). If the fourth receiver was not designated as a member of the second subgroup, it is assigned to a different (e.g. a fourth) transmission channel. These operations are illustrated in blocks 350–354.

By assigning different channels to groups requiring different transmitter power, interference is reduced, and the C/I is proportionately increased.

The granularity of power level to which groups are defined can be varied as desired. For example, groups can be defined such that every receiver station 108 in the group has substantially the same power level requirement (e.g. within ±0.5 dB), or larger power level variations among receiver stations 108 in a group can be tolerated (e.g. ±2.0 dB or more). Further, as shown in the processing loop in FIG. 3, group definitions can change dynamically over time, as parameters affecting the grouping (data transfer requirements, weather, or other factors) change as well.

The different channels assigned to each group can include channels delineated from other channels by frequency (frequency division multiplexing, or FDMA), time (time division multiplexing or TDMA), code (code division multiplexing according to a pseudorandom code, or CDMA), or any combination thereof). In this context, "channels" can therefore include any technique for separating communications from another, exclusive of the spatial diversity provided by the spot beams.

One difficulty in grouping receiver stations 108 requiring higher power transmissions together on a single channel is that the satellite transmitter's peak power capability might be exceeded. This problem can be ameliorated by distributing high power groups among available channels.

FIG. 5 is a diagram illustrating one embodiment of the invention in which channels are delineated by both frequency and time (TDMA/FDMA), and in which higher power transmissions are distributed among the different time slots and channels so that power levels are substantially equalized across the plurality of time slots and frequencies. Note that the total average power across all time slots and frequencies is approximately 3.6 dB. If desired, power levels can be substantially distributed across time slots alone or frequencies alone. In either case, the substantial distribution of groups among frequency and/or time slots is a distribution which prevents spacecraft transmitter peak power levels from being exceeded. Using the above technique, the available power can be allocated to more channels, allocated to existing channels to increase signal to noise ratio (S/N), to save spacecraft power, or to reduce transmitter peak power requirements.

Figure 6:
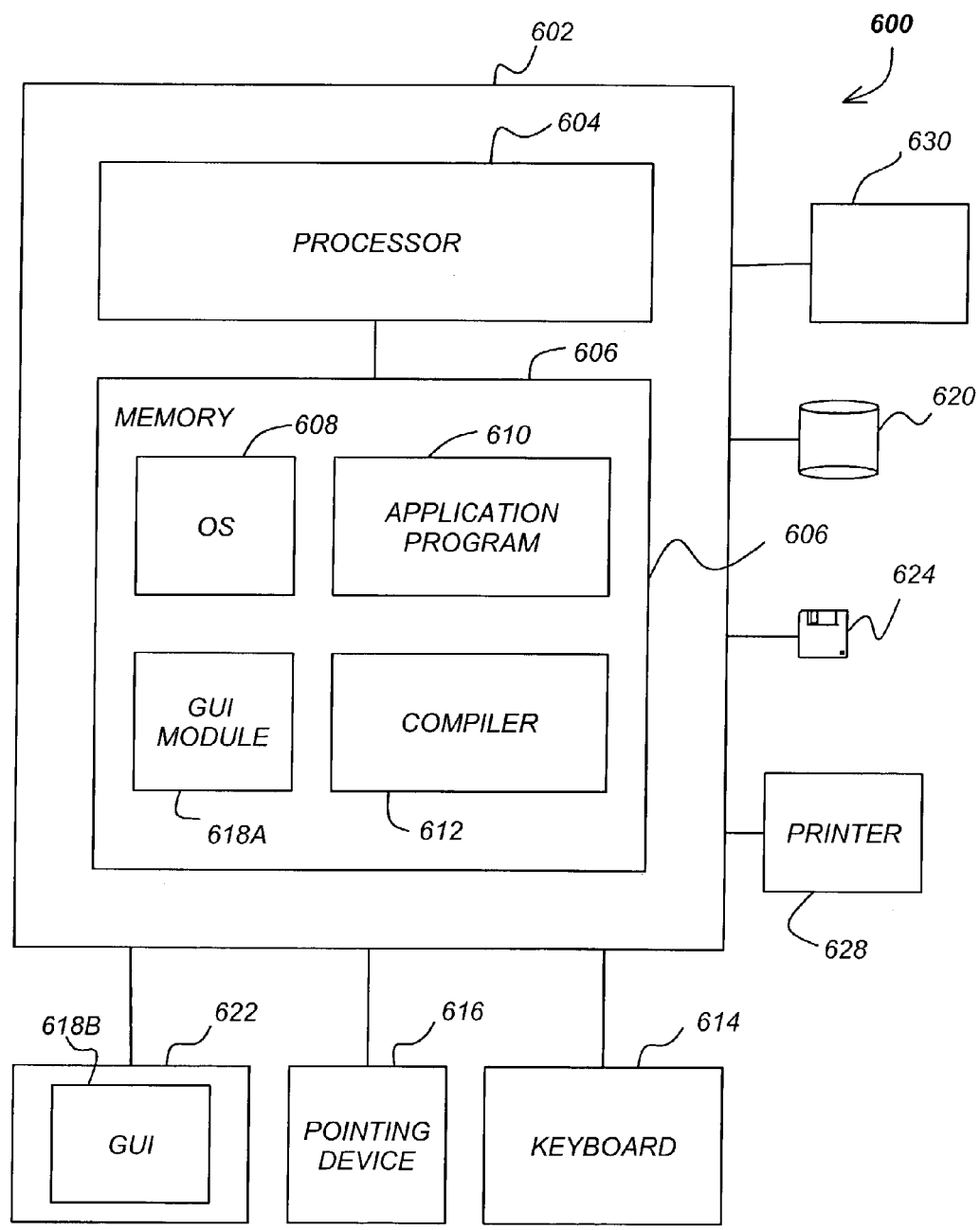
FIG. 6 is a diagram illustrating a computer system that can be used to practice the present invention.

FIG. 6 is a functional block diagram of a computer system 600 that can be used to perform the operations of operations described above. Typically these operations are performed by the uplink equipment 136, but may be performed in a separate processor, a processor in the satellite(s) 150 or a combination thereof. The computer system 600 includes a computer 602 comprises a processor 604 and a memory 606, such as random access memory (RAM) 606. The computer 602 is operatively coupled to a display 622, which presents images such as windows to the user on a graphical user interface 618B. The computer 602 may be coupled to other devices, such as a keyboard 614, a mouse device 616, a printer, etc. Of course, those skilled in the art will recognize that any combination of the above components, or any number of different components, peripherals, and other devices, may be used with the computer 602.

Generally, the computer 602 operates under control of an operating system 608 stored in the memory 606, and interfaces with the user to accept inputs and commands and to present results through a graphical user interface (GUI) module 618A. Although the GUI module 618A is depicted as a separate module, the instructions performing the GUI functions can be resident or distributed in the operating system 608, the computer program 610, or implemented with special purpose memory and processors. The computer 602 also implements a compiler 612 which allows an application program 610 written in a programming language such as COBOL, C++, FORTRAN, or other language to be translated into processor 604 readable code. After completion, the application 610 accesses and manipulates data stored in the memory 606 of the computer 602 using the relationships and logic that was generated using the compiler 612. The computer 602 also optionally comprises an external communication device such as a modem, satellite link, Ethernet card, or other device for communicating with other computers.

In one embodiment, instructions implementing the operating system 608, the computer program 610, and the compiler 612 are tangibly embodied in a computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of instructions which, when read and executed by the computer 602, causes the computer 602 to perform the steps necessary to implement and/or use the present invention. Computer program 610 and/or operating instructions may also be tangibly embodied in memory 606 and/or data communications devices 630, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of transmitting data to a plurality of receivers, each individual receiver disposed in one of a plurality of cells, comprising:
   defining a first set of receivers from at least a portion of the plurality of receivers according to a first desired power level range, comprising
      designating a first receiver as a member of the first set if a desired power level of the signal received by the first receiver is within the first desired power level range; and
      designating a second receiver as a member of the first set if a desired power level of the signal received by the second receiver is within a first desired power level range;
   defining a first group of receivers from the first set of receivers according to a first spatial isolation constraint comprising
      designating the first receiver as a member of a first group;
      designating the second receiver as a member of the first group if the second receiver is spatially isolated from the firs receiver; and
      rejecting the second receiver as a member of the first group if the second receiver is not spatially isolated from the first receiver;
   defining a second set of receivers from a remaining plurality of receivers not a member of the first set of receivers according to a second desired power level range, comprising
      designating a third receiver as a member of the second set if a desired power level of the signal transmitted to the third receiver is with the second desired power level range; and
      designating a fourth receiver as a member of the second set if a desired power level of the signal transmitted to the third receiver is within the second desired power level range;
   defining a second groups of receivers from the second set according to a second spatial isolation constraint comprising
      designating the third receiver as a member of a second group;
      designating the fourth receiver as a member of the second group if the second receiver is spatially isolated from the third receiver; and rejecting the fourth receiver as a member of the second group if the fourth receiver is not spatially isolated from the third receiver; and assigning a first transmission channel to the first group and a second transmission channel to the second group.

2. The method of claim 1, further comprising the steps of:

assigning the first receiver to a first transmission channel; and assigning the second receiver to the first transmission channel if the second receiver is a member of the first group;

assigning the second receiver to a second transmission channel if the second receiver is a not a member of the first group;

assigning the third receiver to a third transmission channel;

assigning the fourth receiver to the third transmission channel if the fourth receiver is a member of the second group;

assigning the fourth receiver to a fourth transmission channel if the second receiver is a not a member of the second group.

3. The method of claim 1, wherein the data is time-division multiplexed and the first transmission channel comprises a first time slot, and the second transmission channel comprises a second time slot.

4. The method of claim 1, wherein the data is frequency-division multiplexed, and the first transmission channel comprises a first frequency band and the second transmission channel comprises a second frequency band.

5. The method of claim 1, wherein the data is code-division multiplexed, and the first transmission channel is transmitted according to a first pseudorandom code and the second transmission channel is transmitted according to a second pseudorandom code.

6. The method of claim 1, further comprising the steps of;

transmitting data to the first group on the first transmission channel; and transmitting data to the second group on the second transmission channel.

7. The method of claim 1, wherein the first transmission channel and the second transmission channel are defined according to a unique combination of a frequency band and a time slot.

8. The method of claim 7, wherein the first group is assigned to a first transmission channel and the second group is assigned to a second transmission channel so as to substantially equalize an available power across the plurality of time slots.

9. The method of claim 7, wherein the first group is assigned to a first transmission channel and the second group is assigned to a second transmission channel so as to substantially equalize an available power across the plurality of frequencies.

10. The method of claim 7, wherein the first group is assigned to a first transmission channel and the second group is assigned to a second transmission channel so as to substantially equalize an available power across the plurality of time slots and frequencies.

11. An apparatus for transmitting data to a plurality of receivers, comprising;

means for defining a first set of receivers from at least a portion of the plurality of receivers according to a first desired power level range, comprising means for defining a first receiver as a member of the first set if a desire power level of the signal transmitted to the first receiver is within the first desired power level range; and means for designating a second receiver as a member of the first set if a desired power level of the signal transmitted to the second receiver is within a first desired power level range;

means for defining a first group of receivers from the first set of receivers according to a first spatial isolation constraint comprising means for designating the first receiver as a member of a first group;

means for designating the second receiver as a member of the first group if the second receiver is spatially isolated from the first receiver; and means for rejecting the second receiver as a member of the first group if the second receiver is not spatially isolated from the first receiver;

means for defining a second set of receivers from a remaining plurality of receivers not a member of the first set of receivers according to a second desired power level range comprising means for designating a third receiver as a member of the second set if a desired power level of the signal transmitted to the third receiver is within the second desired power level range; and means for designating a fourth receiver as a member of the second set if a desired power level of the signal transmitted to the third receiver is within the second desired power level range;

means for defining a second group of receivers from the second set according to a second spatial isolation constraint, comprising means for designating the third receiver as a member of the second group;

means for designating the fourth receiver as a member of the second group if the second receiver is spatially isolated from the third receiver; and means for rejecting the fourth receiver as a member of the second group if the fourth receiver is not spatially isolated from the third receiver; and means for assigning a first transmission channel to the first group and a second transmission channel to the second group.

12. The apparatus of claim 11, further comprising:

means for assigning the first receiver to a first transmission channel; and means for assigning the second receiver to the first transmission channel if the second receiver is a member of the first group;

means for assigning the second receiver to a second transmission channel if the second receiver is a not a member of the first group;

means for assigning the third receiver to a third transmission channel;

means for assigning the fourth receiver to the third transmission channel if the fourth receiver is a member of the second group;

means for assigning the fourth receiver to a fourth transmission channel if the second receiver is a not a member of the second group.

13. The apparatus of claim 11, wherein the data is time-division multiplexed and the first transmission channel comprises a first time slot, and the second transmission channel comprises a second time slot.

14. The apparatus of claim 11, wherein the data is frequency-division multiplexed, and the first transmission channel comprises a first frequency band and the second transmission channel comprises a second frequency band.

15. The apparatus of claim 11, wherein the data is code-division multiplexed, and the first transmission channel is transmitted according to a first pseudorandom code and the second transmission channel is transmitted according to a second pseudorandom code.

16. The apparatus of claim 11, further comprising; means for transmitting data to the first group on a first transmission channel; and
means for transmitting data to the second group on a second transmission channel.

17. The apparatus of claim 11, wherein the first transmission channel and the second transmission channel are defined according to a unique combination of a frequency band and a time slot.

18. The apparatus of claim 17, wherein the first group is assigned to a first transmission channel and the second group is assigned to a second transmission channel so as to substantially equalize an available power across the plurality of time slots.

19. The apparatus of claim 17, wherein the first group is assigned to a first transmission channel and the second group is assigned to a second transmission channel so as to substantially equalize an available power across the plurality of frequencies.

20. The apparatus of claim 17, wherein the first group is assigned to a first transmission channel and the second group is assigned to a second transmission channel so as to substantially equalize an available power across the plurality of time slots and frequencies.

21. An apparatus for transmitting data to a plurality of users, each individual user disposed in one of a plurality of cells, comprising:
a processor; and
a memory communicatively coupled to the processor, the memory storing processor instructions for defining a first set of receivers from at least a portion of the plurality of receivers according to a first desired power level range, defining a first group of receivers from the first set of receivers according to a first spatial isolation constraint, defining a second set of receivers from a remaining plurality of receivers not a member of the first set of receivers according to a second desired power level range, defining a second groups of receivers from the second set according to a second spatial isolation constraint, and assigning a first transmission channel to the first group and a second transmission channel to the second group; and wherein
the instructions for defining a first set of receivers from at least a portion of the plurality of receivers according to a first desired power level range comprises instructions for
designating a first receiver as a member of the set if a desired power level of the signal received by the first receiver is within the first desired power level range; and
designating a second receiver as a member of the set if a desired power level of the signal received by the second receiver is within a first desired power level range;
the instructions for defining a first group from the first set of receivers according to a first spatial isolation constraint comprises instructions for
designating the first receiver as a member of a first group;
designating the second receiver as a member of the first group if the second receiver is spatially isolated from the first receiver; and
rejecting the second receiver as a member of the first group if the second receiver is not spatially isolated from the first receiver;
the instructions for defining a second set of receivers from a remaining plurality of receivers not a member of the first set of receivers according to a second desired power level comprises instructions for
designating a third receiver as a member of the second set if a desired power level of the signal transmitted to the third receiver is within the second desired power level range; and
designating a fourth receiver as a member of the second set if a desired power level of the signal transmitted to the third receiver is within the second desired power level range; and
the instructions for defining a second group of the second set according to a second spatial isolation constraint comprises instructions for
designating the third receiver as a member of a second group;
designating the fourth receiver as a member of the second group if the second receiver is spatially isolated from the third receiver; and
rejecting the fourth receiver as a member of the second group if the fourth receiver is not spatially isolated from the third receiver.

22. The apparatus of claim 21, wherein the data is time-division multiplexed and the first transmission channel comprises a first time slot, and the second transmission channel comprises a second time slot.

23. The apparatus of claim 21, wherein the data is frequency-division multiplexed, and the first transmission channel comprises a first frequency band and the second transmission channel comprises a second frequency band.

24. The apparatus of claim 21, wherein the data is code-division multiplexed, and the first transmission channel is transmitted according to a first pseudorandom code and the second transmission channel is transmitted according to a second pseudorandom code.

25. The apparatus of claim 21, wherein the first transmission channel and the second transmission channel are defined according to a unique combination of a frequency band and a time slot.

26. The apparatus of claim 25, wherein the first group is assigned to a first transmission channel and the second group is assigned to a second transmission channel so as to substantially equalize an available power across the plurality of time slots.

27. The apparatus of claim 25, wherein the first group is assigned to a first transmission channel and the second group is assigned to a second transmission channel so as to substantially equalize an available power across the plurality of frequencies.

28. The apparatus of claim 25, wherein the first group is assigned to a first transmission channel and the second group is assigned to a second transmission channel so as to substantially equalize an available power across the plurality of time slots and frequencies.

29. The apparatus of claim 21, further comprising:
a transmitter, communicatively coupled to the processor, for transmitting data to the first group on the first transmission channel, and transmitting data to the second group on the second transmission channel.

30. The apparatus of claim 29, wherein the processor and memory are disposed on a satellite, and the transmitter transmits the data to the users via spot beams.

31. A system for transmitting data to a plurality of users, each individual user disposed in one of a plurality of terrestrial cells, comprising:
an uplink facility;
a satellite for transmitting the data via spot beams;
a processor; and
a memory, communicatively coupled to the processor, the memory storing processor instructions for defining a first set of receivers from at least a portion of the plurality of receivers according to a first desired power level range, defining a first group of receivers from the first set of receivers according to a first spatial isolation constraint, defining a second set of receivers from a remaining plurality of receivers not a member of the first set of receivers according to a second desired power level range, defining a second groups of receivers from the second set according to a second spatial isolation constraint, and assigning a first transmission channel to the first group and a second transmission channel to the second group; and wherein
the instructions for defining a first set of receivers from at least a portion of the plurality of receivers according to a first desired power level range comprises instructions for
designating a first receiver as a member of the set if a desired power level of the signal received by the first receiver is within the first desired power level range; and
designating a second receiver as a member of the set if a desired power level of the signal received by the second receiver is within a first desired power level range;
the instructions for defining firs group from the first set of receivers according to a first spatial isolation constraint comprises instructions for
designating the first receiver as a member of a first group;
designating the second receiver as a member of the first group if the second receiver is spatially isolated from the first receiver; and
rejecting the second receiver as a member of the first group if the second receiver is not spatially isolated from the first receiver;
the instructions for defining a second set of receivers from a remaining plurality of receivers not a member of the first set of receivers according to second desired power level comprises instruction for
designating a third receiver as a member of the second set if a desired power level of the signal transmitted to the third receiver is within the second desired power level range; and
designating a fourth receiver as a member of the second set if a desired power level of the signal transmitted to the third receiver is within the second desired power level range; and
the instructions for defining a second group of the second set according to a second spatial isolation constraint comprises instructions for
designating the third receiver as a member of a second group;

designating the fourth receiver as a member of the second group if the second receiver is spatially isolated from the third receiver; and
rejecting the fourth receiver as a member of the second group if the fourth receiver is nor spatially isolated from the third receiver.

32. The system of claim 31, further comprising a downlink facility.

33. The system of claim 31, wherein the processor and memory are disposed in the satellite.

34. The system of claim 31, wherein the processor and memory are disposed in the uplink facility.

35. The system of claim 31, wherein the step of defining a first group and a second group from at least a plurality of receiver stations is performed dynamically.

36. A method of transmitting data to a plurality of receivers;
defining groups of the receivers according to desired power level range, wherein each of the receivers of the same desired power level range are spatially isolated from the other receivers of the same desired power level range; and
assigning a transmission channel to each of the groups;
wherein the step of defining groups of receivers according to desired power level range, wherein each of the receivers of the same desired power level range are spatially isolated from the other receivers of the same desired power level range comprises the steps of,
defining a first set of receivers from at least a portion of the plurality of receivers according to a first desired power level range, comprising
designating a first receiver as a member of the first set if a desired power level of the signal received by the first receiver is within the first desired power level range; and
designating a second receiver as a member of the first set if a desire power level of the signal received by the second receiver is within a first desired power level range;
defining the first group receivers from the first set of receivers according to a first spatial isolation constraint, comprising
designating the first receiver as a member of a first group;
designating the second receiver as a member of the first group if the second receiver is spatially isolated from the first receiver; and
rejecting the second receiver as a member of the first group if the second receiver is not spatially isolated from the first receiver; defining a second set of receivers from a remaining plurality of receivers not a member of the first set of receivers according to a second desired power level range, comprising
designating a third receiver as a member of the second set if a desired power level of the signal transmitted to the third receiver is within the second desired power level range; and
designating a fourth receiver as a member of the second set it a desired power level of the signal transmitted to the third receiver is within the second desired power level range;
defining a second groups of receivers from the second set according to a second spatial isolation constraint, comprising
designating the third receiver as a member of the second group;

designating the fourth receiver as a member of the second group if the second receiver is spatially isolated from the third receiver; and rejecting the fourth receiver as a member of the second group if the fourth receiver is not spatially isolated from the third receiver; and assigning a first transmission channel to the first group and a second transmission channel to the second group.

37. The method of claim 36, wherein the step of defining groups of the receivers according to desired power level range, wherein each of the receivers of the same desired power level range are spatially diverse from the other receivers of the same desired power level range comprises the steps of:

defining sets of receivers according to a desired power level range; and defining a group of receivers from each of the sets of receivers wherein each of the receivers in the group are spatially isolated from each other.

* * * * *